United States Patent [19]

Pophillat

[11] Patent Number: 5,448,392
[45] Date of Patent: Sep. 5, 1995

[54] PROCESS FOR THE OPTICAL TRANSMISSION OF A MULTIPLEX OF ELECTRICAL CARRIERS AND APPARATUS FOR PERFORMING SUCH A PROCESS

[75] Inventor: Lucien Pophillat, Rospez, France

[73] Assignee: France Telecom Etablissement Autonome de Droit Public, Paris, France

[21] Appl. No.: 25,116

[22] Filed: Mar. 2, 1993

[30] Foreign Application Priority Data

Mar. 9, 1992 [FR] France .................. 92 02786

[51] Int. Cl.⁶ .................. H04B 10/00; H04J 14/00
[52] U.S. Cl. .................. 359/161; 359/194; 359/180; 359/115
[58] Field of Search ............ 359/124, 125, 126, 134, 359/160, 161, 194, 180; 370/69.1, 70, 76

[56] References Cited

U.S. PATENT DOCUMENTS

| | | | |
|---|---|---|---|
| 4,784,453 | 11/1988 | Shaw et al. | 350/96.16 |
| 5,210,633 | 5/1993 | Trisno | 359/194 |
| 5,317,443 | 5/1994 | Nishimoto | 359/187 |
| 5,327,279 | 7/1994 | Farina et al. | 359/161 |

FOREIGN PATENT DOCUMENTS

| | | |
|---|---|---|
| 0078884 | 5/1983 | European Pat. Off. . |
| 87/04529 | 5/1983 | WIPO . |
| WO87/04529 | 7/1987 | . |
| WO91/15927 | 10/1991 | WIPO . |

OTHER PUBLICATIONS

Thomas E. Darcie and George E. Bodeep, "Lightwave Subcarrier CATV Transmission Systems", IEEE Transactions on Microwave Theory and Techniques, vol. 38, No. 5, pp. 524–533, May, 1990.

K. Alameh and R. A. Minasian, "Optimum Optical Modulation Index of Laser Transmitters in SCM Systems", Electronics Letters, vol. 26, No. 16, pp. 1273–1275, 2nd Aug., 1990.

J. H. Angenent, "Simple Model for Calculation of Distortion in an Optical Analogue Subcarrier Multiplexed CATV System", Electronics Letters, vol. 26, No. 24, pp. 2049–2050, 22nd Nov., 1990.

K. Alameh and R. A. Minasian, "Ultimate Limits of Subcarrier Multiplexed Lightwave Transmission", Electronics Letters, vol. 27, No. 14, pp. 1260–1262, 4th Jul., 1991.

M. R. Phillips and T. E. Darcie, "Numerical Simulation of Clipping-Induced Distortion in Analog Lightwave Systems", IEEE Transactions Photonics Technology Letters, vol. 3, No. 12, pp. 1153–1155, Dec., 1991.

C. J. Chung and Ira Jacobs, "Simulation of the Effects of Laser Clipping on the Performance of AM SCM Lightwave Systems", IEEE Transactions Photonics Technology Letters, vol. 3, No. 11, pp. 1034–1036, Nov., 1991.

N. J. Frigo and G. E. Bodeep, "Clipping Distortion in AM-VSB CATV Subcarrier Multiplexed Lightwave Systems", IEEE Photonics Technology Letters, vol. 4, No. 7, pp. 781–784, Jul., 1992.

(List continued on next page.)

Primary Examiner—Leo H. Boudreau
Assistant Examiner—Bhavesh Mehta
Attorney, Agent, or Firm—Oblon, Spivak, McClelland, Maier & Neustadt

[57] ABSTRACT

A process and apparatus for the optical transmission of a multiplex of a electrical carriers in which production takes place, from the electrical signal corresponding to the multiplex of electrical carriers, of an electrical asymmetrization signal, whose frequency spectrum is included in the unoccupied frequency range where the multiplex of electrical carriers is absent located in the lower part of the frequency spectrum of the multiplex of electrical carriers. The electrical asymmetrization signal is added to a delayed electrical signal corresponding to the multiplex of electrical carriers, and power modulation takes place of an optical source by the thus obtained electrical asymmetrical signal. The process and apparatus has application to optical fibre transmission systems.

9 Claims, 3 Drawing Sheets

OTHER PUBLICATIONS

M. R. Phillips, A. H. Gnauck, T. E. Darcic, N. J. Frigo, G. E. Bodeep and E. A. Pitman, "112 Channel Split–Band WDM Lightwave CATV System", IEEE Photonics Technology Letters, 1992, 4, (7) 790–792.

G. R. Joyce, R. Olshansky, R. Childs and T. Wei, "Video Distribution System with 40 AM–VSB Channels and 22 dB Link Budget", Electronics Letters, 1991, 27 (18) pp. 1613–1614.

G. R. Joyce and R. Olshansky, "Subcarrier Transmission of Compressed Digital Video", IEEE Photonics Technology Letters, 1992, 4, (6) pp. 665–667.

L. Pophillat and R. David, "Less than 3 pA/vHz over 1–800 MHz Noise Current Spectral Density Optical Receiver for SCM–CATV Systems", Electronics Letters, vol. 29, No. 19, pp. 1721–1722, Jul., 1993.

C. J. McGrath, "Multi–Channel AM Fiber Optic CATV Trunks–From Lab to Reality", NCTA Technical Papers, p. 232, 1989.

Robert Olshansky and Gerald Joyce, "Subscriber Distribution Networks Using Compressed Digital Video", Journal of Lightwave Technology, vol. 10, No. 11, pp. 1760–1765, Nov., 1992.

Robert Olshansky, Vincent A. Lanzisera and Paul M. Hill, "Subcarrier Multiplexed Lightwave Systems for Broad–Band Distribution", Journal Lightwave Technology, vol. 7, No. 9, pp. 1329–1341, Sep., 1989.

L. Pophillat, "Optical Modulation Depth Improvement in SCM Lightwave Systems Using a Dissymmetrization Scheme", IEEE Photonics Technology Letters, vol. 6, No. 6, pp. 750–753, Jun., 1994.

Keang–Po Ho and Joseph M. Kahn, "Equalization Technique to Reduce Clipping–Induced Nonlinear Distortion in Subcarrier–Multiplexed Lightwave Systems", IEEE Photonics Technology Letters, vol. 5, No. 9, pp. 1100–1103, Sep., 1993.

Shlomo Ovadia et al., "Digital Channel Degradation in Hybrid Multichannel AM/16QAM Video Lightwave System", OFC'94 Technical Digest, Paper ThS1, pp. 260–261, 1994.

Nobuya Shinoda et al., "BER Dependence on CTB in AM/QPSK Hybrid Optical Transmission Systems", OFC'94 Technical Digest, Paper WH5, pp. 111–112, 1994.

G. R. Joyce, R. Olshansky and R. Gross, "Clipping Penalty in Fiber–Based Compressed–Digital Video Transmission Systems", OFC'94 Technical Digest, Paper WH4, pp. 110–111, 1994.

X. Lu G. E. Bodeep and T. E. Darcie, "Impulse–Induced Bit–Error Impairment in AM–VSB/64–QAM Hybrid Optical Transmission Systems", OFC'94 Technical Digest, Paper WH3, pp. 108–109, 1994.

Kinh Pham et al., "Performance of 64–QAM Signals in a Hybrid AM–VSB/QAM Optical Transmission System", OFC'94 Technical Digest, Paper WH2, pp. 107–108, 1994.

K. Maeda, H. Nakata and K. Fujito, "Analysis of BER of 16QAM Signal in AM/16QAM Hybrid Optical Transmission System", Electronics Letters, vol. 29, No. 7, pp. 640–642. 1st Apr., 1993.

Q. Shi, "Performance of M–ary QAM in Hybrid AM/–QAM Multichannel Lightwave Transmission With and Without Coding", OFC/IOOC'93 Technical Digest, Paper ThL3, pp. 221–223, 1993.

Kazuki Maeda et al., "BER Characterstics of 16QAM in an AM/16QAM Hybrid Optical Transmission System", OFC/IOOC'93 Technical Digest, Paper ThL2, pp. 220–221, 1993.

G. R. Joyce and R. Olshansky, "Implication of Clipping Distortion for Compressed Digital Video Transmission", IEEE Photonics Technology Letters, vol. 4, No. 7, pp. 787–790, Jul., 1992.

C. Y. Kuo and L. C. Upadhyayula, "Ultimate Performance in a Modulated–Laser–Based AM–VAB Video–Transport System", OFC/IOOC'93 Technical Digest, pp. 219–221, 1993.

Q. Shi, R. S. Burroughs, and D. Lewis, "An Alternative Model for Laser Clipping–Induced Non–Linear Distortion for Analog Lightwave CATV Systems", IEEE Photonics Technology Letters, vol. 4, No. 7, pp. 784–787, Jul., 1992.

A. A. M. Saleh, "Fundamental Limit on Number of Channels in Subcarrier–Multiplexed Lightwave CATV System", Electronics Letters, vol. 25 No. 12, pp. 776–777, 8th Jun., 1989.

IEEE Photonics Technology Letters, vol. 1, No. 10, Oct. 1, 1989, pp. 343–345, W. I. Way, et al., "Multichannel AM–VSB Television Signal Transmission Using an Erbium–Doped Optical Fiber Power Amplifier".

Patent Abstracts of Japan, vol. 10, No. 11, (E–374), Jan. 17, 1986, JP–A–60 173 938, Sep. 7, 1985.

PROCESS FOR THE OPTICAL TRANSMISSION OF A MULTIPLEX OF ELECTRICAL CARRIERS AND APPARATUS FOR PERFORMING SUCH A PROCESS

TECHNICAL FIELD

The present invention relates to a process for optical transmission by power modulation of the optical carrier of a multiplex or group of electrical carriers having a range which is unoccupied in the lower part of its frequency spectrum. The invention also relates to an apparatus for performing this process.

This invention has a particularly interesting application in optical fiber transmission systems for a multiplex of analog or digital carriers, particularly for the distribution of residual sideband amplitude modulation (RSBAM) television channel distribution and transmission.

PRIOR ART

The use of the optical procedure for the transmission and distribution of video channels in the form of a RSBAM carrier multiplex is starting to be industrialized. This has been made possible by recent advances on optical sources with regards linearity and relative intensity noise (RIN). Moreover, erbium-doped fibre optical amplifiers are suitable for analog signals, because they are highly linear as soon as the modulation frequency of the optical signal exceeds a few kilohertz. Installed in line or as an emission amplifier, as a result of their high gain and high output power, they make it possible to obtain an adequate energy budget both for establishing long ranges and for the distribution of optical energy to several reception points by means of optical couplers.

For optical systems for the transmission and distribution of a multiplex of carriers such as e.g. RSBAM video carriers, any means making it possible to increase the energy budget is of interest. Thus, this increase can be used for raising the range between two line amplifiers as well as the distribution rate of the optical source, so that cost economies are made.

The object of the present invention is to improve the energy budget of optical systems carrying a multiplex of electrical carriers. The electrical signal corresponding to a multiplex of carriers has a low amplitude for a considerable percentage of the time and a high amplitude for a small percentage of the time. To improve the graphical clarity, such an electrical signal is represented in simplified form by the signal A, which is symmetrical with respect to its rest point PR in the attached FIG. 1a.

A precise representation corresponding to a multiplex of 42 unmodulated sinusoidal carriers is given in the article by C. J. McGrath entitled "Multi-channel AM fibre optic CATV trunks from lab to reality", published in NCTA Technical Papers, 1989, p.232.

FIG. 1b shows an example of a frequency spectrum A' corresponding the signal A and formed by n carriers, i.e. P1 to Pn. In this example and in general terms for a carrier multiplex, there an unoccupied range between the frequency F=0 and the frequency of the first carrier P1.

The optical signal obtained in a known manner at the output of optical signal power modulated by the signal A is represented FIG. 1c by the signal B, whose instantaneous amplitude oscillates around a mean power PM midway between a maximum instantaneous power PIM and the zero power PN. The signal B is shown ere at the limit of clipping, both in the vicinity of the maximum instantaneous power and the zero power and it is pointed out that the clipping or limiting of such a signal produces into modulation distortion. On observing the hatched part representing the optical energy, it can be seen that the optical modulation rate is low for a considerable percentage of the time, so that on the frequency spectrum B' in FIG. 1d and corresponding to the signal B, there is a d.c. component CC of high value compared with the level NP of the carriers P1 to Pn. Thus, there is both a poor utilization of the transmitted optical power and, after photodetection, a shot noise spectral density DB proportional to the mean optical power received, which is high in comparison with the level NP of the carriers P1 to Pn, which constitutes a serious disadvantage.

The object of the present invention is to obviate this disadvantage.

DESCRIPTION OF THE INVENTION

The invention aims at reducing the shot noise spectral density and therefore increase the carrier-to-noise ratio at the output of the optical receiver.

To this end, the invention proposes a process consisting, based on the electrical signal corresponding to a carrier multiplex, of producing an electrical asymmetrization signal, whose frequency spectrum is included in the unocuppied range in the lower part of the frequency spectrum of said electrical carrier multiplex, adding said electrical asymmetrization signal to the electrical signal corresponding to said previously delayed multiplex and power modulating an optical source by the thus obtained electrical asymmetrical signal.

An advantage of this process is that the shot noise spectral density is lower. This advantage leads to an increase in the carrier-to-noise ratio at the output of the optical receiver and consequently improves the sensitivity.

Advantageously power modulation takes place of said optical source by the electrical asymmetrical signal obtained, relative to positive and negative alternations with respect to its rest point, which brings about correspondence of the minima or maxima of the optical power with the low or high amplitude alternations of said electrical asymmetrical signal.

In the process of the invention, one way of obtaining an electrical asymmetrization signal consists of detecting, on the electrical signal corresponding to the multiplex to be transmitted, amplitudes below or above a threshold located below or above its rest point, carrying out a low pass filtering of the signal resulting from the preceding detection, in a frequency band included in the unoccupied range of the frequency spectrum of said multiplex and inverting and amplifying the signal resulting from the preceding filtering.

An advantageous variant of this method consists of carrying out the same operations and also temporarily maintaining the peak values of the signal from the detection prior to the filtering.

The invention also relates to an apparatus for performing this process. It comprises a means for distributing on two outputs the electrical signal corresponding to the multiplex to be transmitted, a means for producing an electrical asymmetrization signal, a means for delaying the electrical signal corresponding to said multiplex, a means for adding said delayed electrical signal to said electrical asymmetrization signal and a power modulatable electrooptical conversion means.

In an advantageous embodiment of said apparatus the means for producing an electrical asymmetrization signal comprises a threshold detector receiving an electrical signal corresponding to the multiplex to be transmitted and supplying a band pass filter connected to the input of an inverting amplifier. The means for producing an electrical asymmetrization signal can also comprise a means for temporarily maintaining peak values.

Advantageously the power modulatable electrooptical conversion means comprises an output optical fibre amplifier.

An advantage is obtained when using a fibre optic amplifier at the output of the power modulatable optical source. Optical sources such as a directly modulated laser diode or a continuously operating laser followed by an external modulator supply an instantaneous optical power which is limited to a maximum value. However, a fibre optic amplifier is limited in mean optical power terms and is able to supply a very high instantaneous optical power. It should also be noted that this advantage occurs in the same way when the fibre optic amplifier is used as the line amplifier.

DETAILED DESCRIPTION OF EMBODIMENTS

Figure 1A:
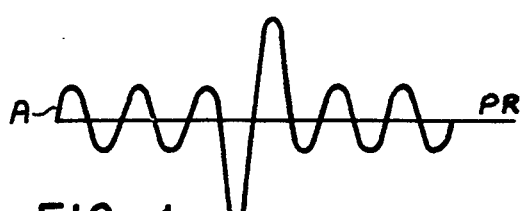
FIG. 1a–1d, already described, show the principle of optical transmission of a multiplex of electrical carriers according to a known process.
Figure 1B:
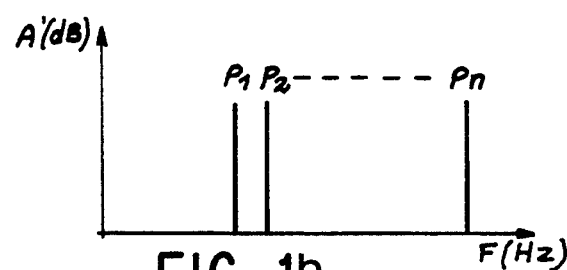
Figure 1C:
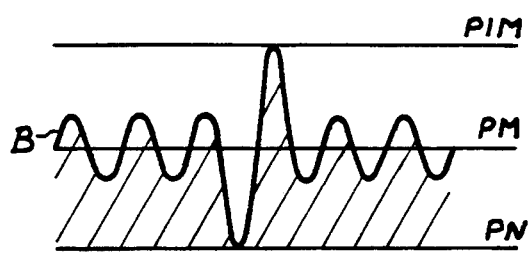
Figure 1D:
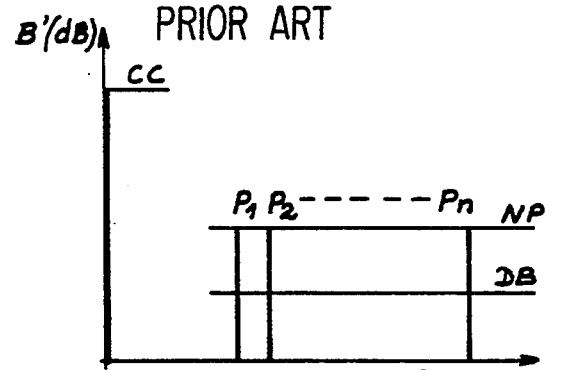

The prnciple of the invention can be explained in conjunction with FIG. 2, which is to be compared with FIG. 1, already described relative to the prior art.

FIG. 2 shows time forms of electrical signals A,C,D and E and optical signals F and G, as well as the corresponding frequency spectra respectively A',C',D',E',F' and G'. The signal A, which is identical to the signal A of FIG. 1, corresponds to the multiplex to be transmitted and constituted by carriers P1 to Pn. The signal C is produced by detecting the amplitudes of the signal A below the threshold S. It is formed by pulses and its spectrum C', formed by intermodulation products of the carriers P1 to Pn is very extensive.

The signal D is obtained from the signal C by filtering, inversion and amplification. The filtering used here is a low pass filtering with a cut-off frequency below the frequency of the first carrier P1. Thus, the components of the spectrum D' are clearly separate from the carriers P1 to Pn, which makes it possible to add the signal D to the signal A without this disturbing the carriers P1 to Pn. In the case where the multiplex to be transmitted comprises one or more auxiliary low frequency carriers, it is then appropriate to complete the aforementioned low pass filtering by a high pass filtering with a cut-off frequency above the highest frequency of said auxiliary carriers.

The filtering applied to the signal C is then of the band pass type. In practice, even when there are no auxiliary low frequency carriers in the multiplex to be transmitted, the filtering applied will be of the band pass type, the currently used circuits having connecting capacitors which naturally cause a high pass filtering. In the same way as the signal C, the signal D is formed by pulses, which are wider as a result of the low pass filtering. Thus, this filtering causes a delay, which is not rendered visible in FIG. 2 so as to facilitate the understanding of the latter.

The thus obtained signal D is then added to the signal A, the latter being in practice delayed beforehand in order to compensate the delay given to the signal D by the low pass filtering, with a view to producing the signal E, whose characteristic is that of being asymmetrical relative to the positive and negative amplitudes thereof with respect to its rest point PR. The spectrum E' is the sum of the spectra A' and D'.

The signal E can now be used for power modulating an optical source. As a result of its asymmetry, the modulation polarity is not unimportant, as it was with a symmetrical signal such as the signal A. By choosing an appropriate modulation polarity the signal F is obtained, which is compared with the signal B of FIG. 1. It is pointed out that the maximum peak-to-peak amplitudes are adjacent. The mean optical power PM of the signal F is also lower, so that on the spectrum F' there is a lower d.c. component CC and consequently an also lower shot noise spectral density DB.

Reference is now made to the fact that in practice there are two main noise sources limiting the sensitivity on reception of an optical signal. They consist on the one hand of the background noise of the electrical amplification stages and on the other the shot noise inherent in the quantum photodetection process. This shot noise determines the ultimate sensitivity limit for a given received optical power. In practice, the shot noise generally dominates the background noise of the amplification stages either because the mean optical power received is high, or because use is made of an avalanche photodiode or a photodiode without internal gain preceded by an optical preamplifier. In addition, a reduction of the shot noise spectral density DB leads to an increase in the carrier-to-noise ratio at the output of the optical receiver.

An advantage of the process illustrated in FIG. 2, compared with that illustrated in FIG. 1, is consequently that the shot noise spectral density DB is lower. As a result of this advantage there is a increase in the carrier-to-noise ratio at the output of the optical receiver and consequently there is a sensitivity improvement. It should be noted that this sensitivity improvement also occurs at the input of an optical amplifier installed as a line amplifier.

Another advantage occurs when a fibre optic amplifier is used at the output of the power modulatable optical source. Thus, optical sources such as directly modulated laser diodes or a laser operating continuously followed by an external modulator supply an instantaneous optical power, which is limited to a maximum value. Conversely, a fibre optic amplifier is limited in mean optical power terms and is able to supply a very high instantaneous optical power. In addition, when an optical source followed by a fibre optic amplifier is power modulated by the signal E, at the output a signal G is obtained, which is to be compared with the signal B of FIG. 1, said two signals having the same mean optical power PM. It is clear that the signal G has a higher modulation amplitude, so that there is a higher level NP on the spectrum G'. It should also be noted that this advantage occurs in the same way when the fibre optic amplifier is used as a line amplifier.

For example, when the mean optical power is equal to a quarter of the maximum instantaneous optical power, as in the case of the graphical representation of the signals F or G, the potential improvement to the sensitivity at the input of an optical receiver or an optical line amplifier on the one hand and the increase in the level of the carriers P1 to Pn at the output of the fibre optic amplifier on the other are 3 dB. Thus, for example, there is an increase in the transmission energy budget which can reach 6 dB.

Figure 3A:
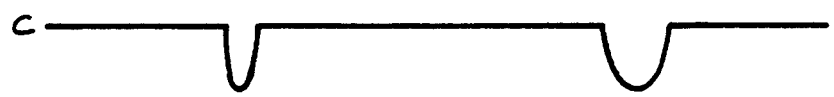
FIGS. 3a and 3b illustrate two methods for producing an electrical asymmetrization signal.

An explanation will now be given of a variant of the method for producing an electrical asymmetrization signal D with respect to FIGS. 3a and 3b. It has been pointed out that in the case of the signal C of FIG. 2 only one pulse is shown, but in reality said signal is a train of pulses having unequal widths and amplitudes. The amplitude and width variation ranges are dependent on the composition of the multiplex to be transmitted. FIG. 3a shows a particular example of the signal C having two pulses of equal amplitudes and unequal widths. Following low pass filtering, said two pulses are widened and their width is fixed by the cut-off frequency of the filter. The surface of these pulses is kept to within an amplification coefficient. Therefore the amplitude of a filtered pulse is dependent on its width prior to filtering. This is why there is a variation $e_1$ on the amplitudes of the two pulses of the signal D, which constitutes a disadvantage. Thus, on adjusting the amplification gain following filtering so that the first pulse of the signal D produces an optimum asymmetrization, the amplitude of the second pulse will be too high and vice versa.

Figure 3B:
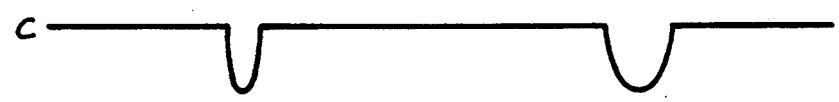
Figure 2A:
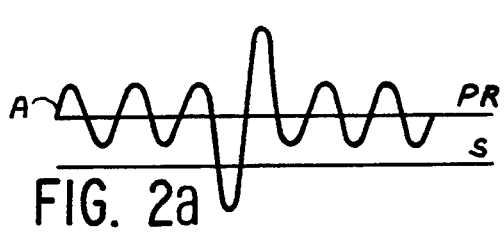
FIG. 2a–2d show the principle of the process for the optical transmission of a multiplex of electrical carriers according to the invention.
Figure 2B:
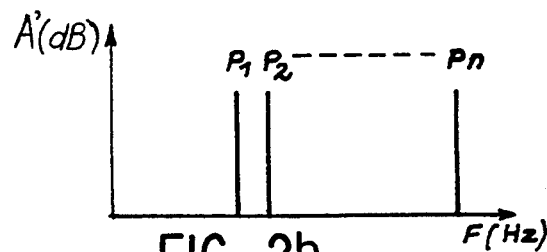
Figure 2C:
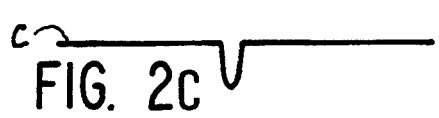
Figure 2D:
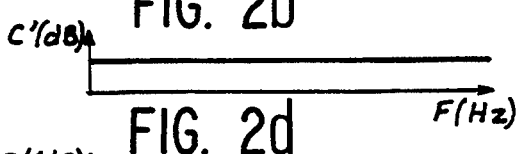
Figure 2E:
Figure 2F:
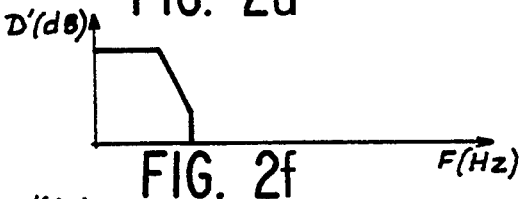
Figure 2G:
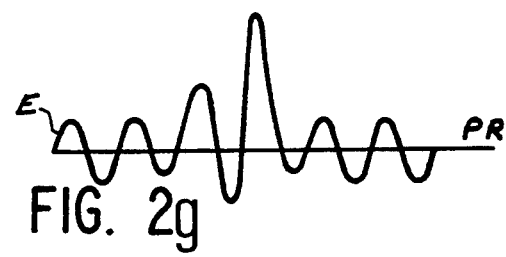
Figure 2H:
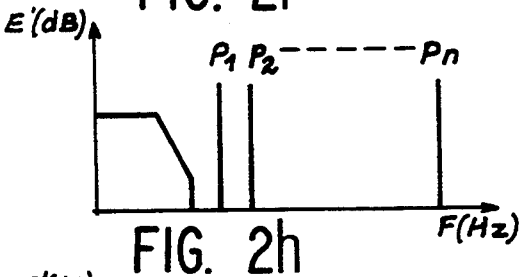
Figure 2I:
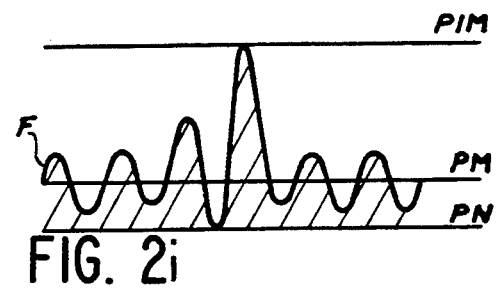
Figure 2J:
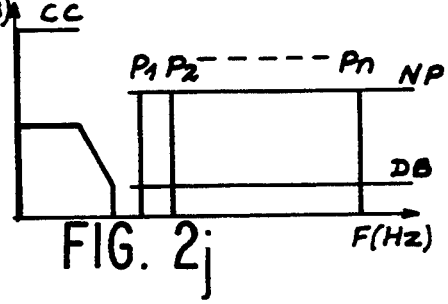
Figure 2K:
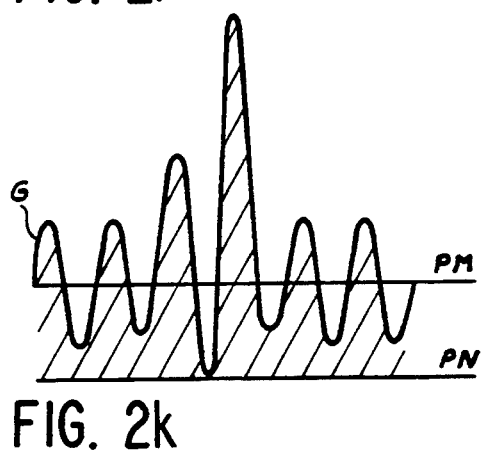
Figure 2L:
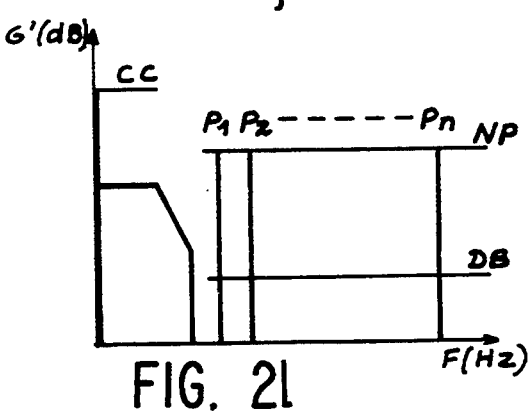

One way to obviate this disadvantage consists of temporarily maintaining the peak value of one pulse of the signal C, prior to the low pass filtering and as illustrated in FIG. 3b. In the latter it is possible to see a signal C identical to the signal C of FIG. 3a and a signal H obtained from the signal C by producing here an exponential decay of the pulses from their peak with a time constant of high value compared with the average duration of the pulses of the signal C. This choice results from the fact that in practice this operation can be carried out very simply and in known manner with the aid of a semiconductor element, a resistor and a capacitor. Thus, after low pass filtering of the signal H, whose pulses have surfaces which only differ slightly, a signal D is obtained having a variation $e_2$ on the amplitudes of the pulses smaller than the variation $e_1$.

Figure 4:
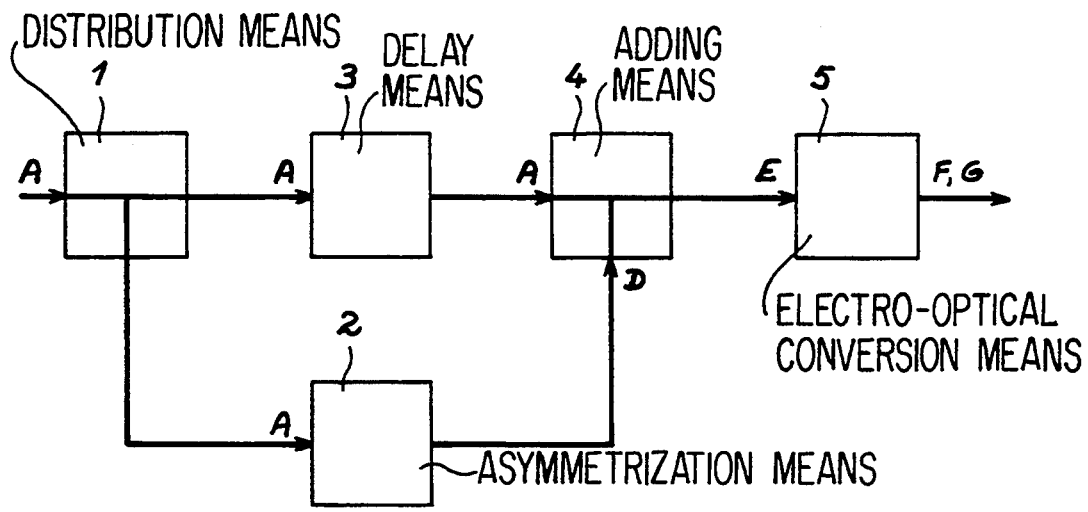
FIG. 4 is a functional diagram of an apparatus for producing an optical signal according to the transmission process of the invention.

An embodiment will now be described of an apparatus shown in FIG. 4 for performing the transmission process according to the invention. This apparatus comprises a distribution means 1 receiving the electrical signal A corresponding to the multiplex to be transmitted and supplying said signal on two outputs. This means can be a passive coupler and in this case the levels at the outputs are below the level at the input, or an active distributor which can optionally have an insertion gain. This apparatus also comprises a means 2 producing an electrical asymmetrization signal D, a delay means 3 which can e.g. be a coaxial line, an addition means 4 producing an asymmetrical electrical signal E and which, in the same way as the distribution means 1, can be active or passive. This apparatus finally comprises a power modulatable electrooptical conversion means 5 producing an optical signal F if limited in instantaneous optical power terms or G if limited in mean optical power terms.

The optical signals F or G are e.g. transmitted on a fibre optic line and arrive on a photoreceiver. The latter can be of a conventional nature and then supplies an asymmetrical electrical signal, or it can incorporate a band stop filter for eliminating the asymmetrization signal and it then supplies a symmetrical electrical signal.

Figure 5A:
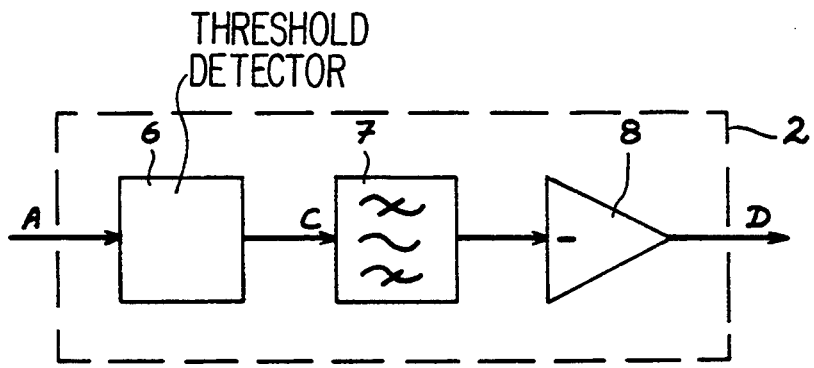
FIGS. 5a and 5b show two methods for producing a means for obtaining an electrical asymmetrization signal.

A first embodiment of the means 2 for producing an electrical asymmetrization signal D is shown in FIG. 5a. It comprises a threshold detector 6 receiving the signal present on one of the outputs of the distribution means 1 and having to produce a signal C on detecting the amplitudes below or above a threshold below or above a rest point, a band pass filter 7 and an inverting amplifier 8.

Figure 5B:
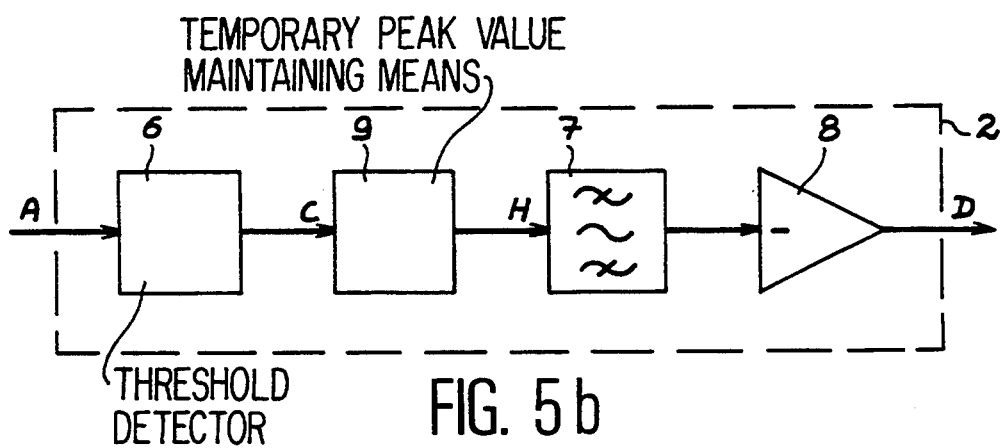

A second embodiment of the means 2 for producing an electrical asymmetrization signal D is shown in FIG. 5b. It comprises the same elements 6,7 and 8 as in FIG. 5a with also a means 9 for temporarily maintaining the peak values of the signal C. A simple embodiment of said means 9 comprises in known manner a semiconductor element, a resistor and a capacitor.

It is obvious that the invention has only been described and shown in a preferred, non-limitative manner and that without passing outside the scope of the invention the components can be replaced by equivalent components.

I claim:

1. A process for the optical transmission of a multiplex of electrical carriers, comprising the steps of: producing an electrical asymmetrization signal from the electrical signal corresponding to said multiplex of electrical carriers, said electrical asymmetrization signal having a frequency spectrum in an unoccupied frequency range wherein said multiplex of electrical carriers is absent, said unoccupied frequency range being located in the lower part of the frequency spectrum of said multiplex of electrical carriers; adding said electrical asymmetrization signal to a delayed electrical signal corresponding to said multiplex of electrical carriers to provide an electrical asymmetrical signal; and power modulating an optical source by said electrical asymmetrical signal.

2. The process according to claim 1, wherein said power modulating comprises power modulating the optical source by the electrical asymmetrical signal, relative to positive and negative alternations with respect to its quiescent point, with a modulation polarity making minima or maxima of the optical power correspond to low or high amplitude alternations of said electrical asymmetrical signal.

3. The process according to claim 1, wherein said producing an electrical asymmetrization signal comprises detecting, on the electrical signal corresponding to the multiplex of electrical carriers to be transmitted, the amplitudes below or above a threshold which is below or above the quiescent point of said multiplex of electrical carriers.

4. The process according to claim 3, wherein said producing an electrical asymmetrization signal further comprises band pass filtering the signal resulting from said detecting in a frequency band included in said unoccupied frequency range of the frequency spectrum of said multiplex of electrical carriers, and inverting and amplifying the signal resulting from said band pass filtering.

5. The process according to claim 4, wherein said producing an electrical asymmetrization signal further comprises temporarily maintaining peak values of the signal resulting from said detecting prior to said band pass filtering.

6. An apparatus for the optical transmission of a multiplex of electrical carriers, comprising: means for distributing the electrical signal corresponding to the multiplex of electrical carriers to be transmitted; means for producing an electrical asymmetrization signal from said electrical signal corresponding to said multiplex of electrical carriers, said electrical asymmetrization signal having a frequency spectrum in an unoccupied frequency range wherein said multiplex of electrical carriers is absent, said unoccupied frequency range being located in the lower part of the frequency spectrum of said multiplex of electrical carriers, said means for producing an electrical asymmetrization signal being operably connected to said means for distributing; means for delaying said electrical signal corresponding to said multiplex of electrical carriers to produce a delayed electrical signal, said means for delaying being operably connected to said means for distributing; means for adding said delayed electrical signal to said electrical asymmetrization signal to provide an electrical asymmetrical signal; and power modulatable electrooptical conversion means for power modulating an optical source by said electrical asymmetrical signal.

7. The apparatus according to claim 6, wherein said means for producing an electrical asymmetrization signal comprises a threshold detector receiving said electrical signal corresponding to the multiplex of electrical carriers to be transmitted, a band pass filter operably connected to an output of said threshold detector, and an inverting amplifier, said inverting amplifier having an input connected to an output of said band pass filter.

8. The apparatus according to claim 7, wherein said means for producing an electrical asymmetrization signal also comprises means for temporarily maintaining peak values.

9. The apparatus according to claim 6, wherein said power modulatable electrooptical conversion means comprises a fibre optic amplifier.

* * * * *